United States Patent [19]
Esculpavit et al.

[11] Patent Number: 4,777,555
[45] Date of Patent: Oct. 11, 1988

[54] DEVICE FOR PROTECTING AN ELECTRIC POWER LINE AGAINST HIGH TRANSIENT OVERVOLTAGES

[75] Inventors: Michel Esculpavit, Cergy; Christian Girard, Herblay, both of France

[73] Assignee: Les Cables De Lyon, Clichy Cedex, France

[21] Appl. No.: 71,824

[22] Filed: Jul. 10, 1987

[30] Foreign Application Priority Data

Jul. 11, 1986 [FR] France ................ 86 10188

[51] Int. Cl.⁴ ............................................ H02H 3/22
[52] U.S. Cl. .................................... 361/111; 361/118
[58] Field of Search .............. 361/58, 54, 110, 111, 361/118, 126, 28, 29

[56] References Cited

U.S. PATENT DOCUMENTS 3,173,029  3/1965  Nadolsky .............................. 361/13
4,541,030  9/1985  Biegelmeier ..................... 361/118 X
4,689,713  8/1987  Hourtane et al. ................... 361/118

FOREIGN PATENT DOCUMENTS 2501931  9/1982  France .
1638061  3/1971  Fed. Rep. of Germany .

Primary Examiner—A. D. Pellinen
Assistant Examiner—Todd E. DeBoer
Attorney, Agent, or Firm—Sughrue, Mion, Zinn, Macpeak, and Seas

[57] ABSTRACT

A device for protecting a polyphase electric power line against high transient overvoltages comprises at least two stages in series, the first stage being provided with a spark-gap and a decoupling inductor and being followed by a stage having a bridge limiter including two oppositely-biased power diodes each connected in series with a high-value capacitor, a time-delay contactor being placed at the terminals of each power-diode/-capacitor assembly so as to permit charging of the capacitors through a resistor and auxiliary diodes and then to permit cut-off of the bridge limiter. The protection device has only one pair of high-value capacitors each connected in common in series with one of the power diodes of each phase, an auxiliary diode being associated with each capacitor.

1 Claim, 1 Drawing Sheet

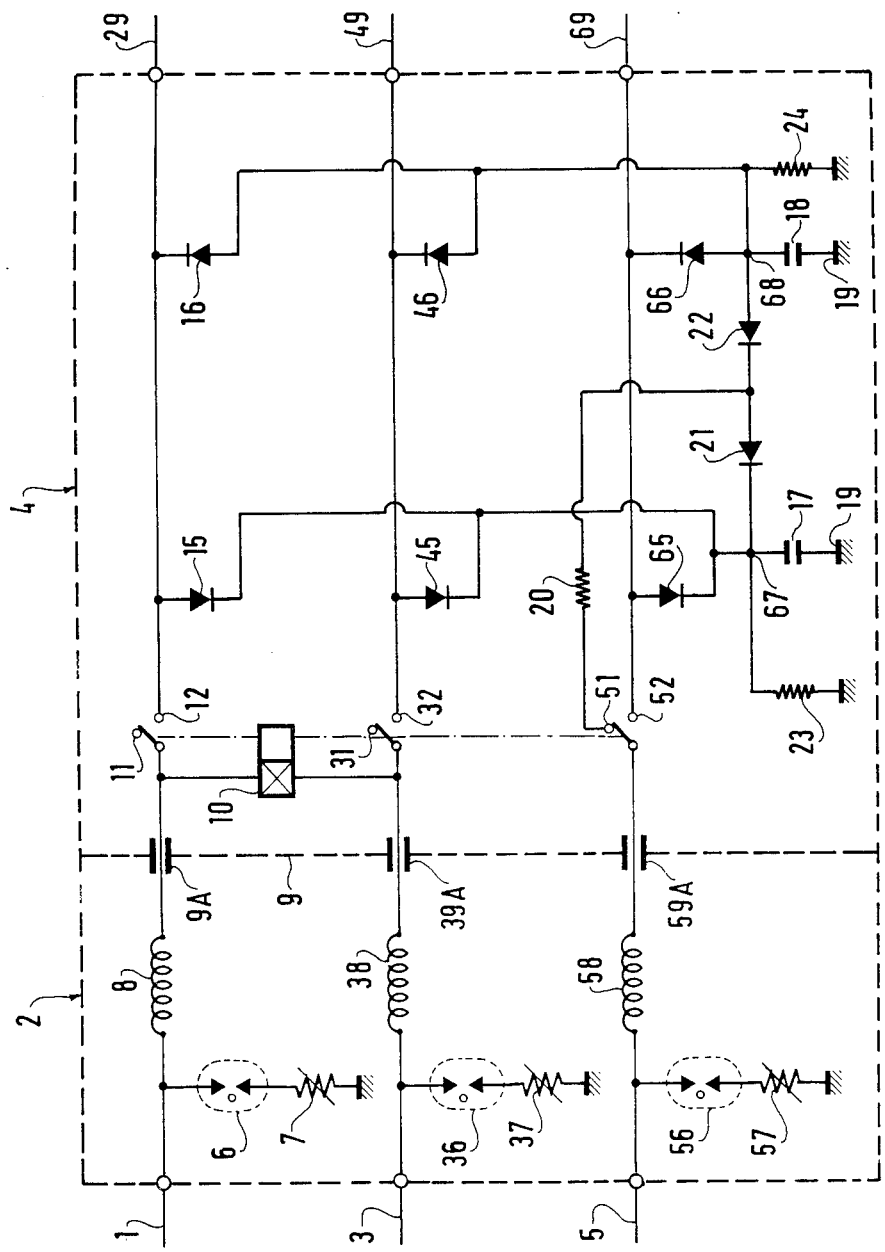

DEVICE FOR PROTECTING AN ELECTRIC POWER LINE AGAINST HIGH TRANSIENT OVERVOLTAGES

BACKGROUND OF THE INVENTION

French patent Application No. 583,590 or U.S. Pat. No. 4,689,713 to Hourtane et al relates to a device for protecting a polyphase electric power line against high transient overvoltages of electromagnetic origin, comprising at least two stages in series, the first stage being provided with a spark-gap and an inductor for decoupling with respect to the following stage and being followed by a stage having a bridge limiter including two oppositely-biased power diodes each connected in series with a high-value capacitor, a time-delay contactor being placed at the terminals of each power-diode/-capacitor assembly so as to permit charging of the capacitors through a resistor and auxiliary diodes placed between on the one hand the capacitor and on the other hand the connection between the power diode and the capacitor, then to permit cutoff of the bridge limiter once all the capacitors have been charged.

Although the device disclosed in the patent Application cited in the foregoing does in fact ensure effective protection and limits current surges at the time of startup, the device nevertheless makes it necessary in the case of a polyphase network to employ two high-value capacitors on each phase as well as a resistor and two auxiliary diodes. This device consequently suffers from a certain degree of complexity as well as bulk.

SUMMARY OF THE INVENTION

The improvement in accordance with the present invention is intended to reduce the complexity, bulk and cost of a device of this type in a polyphase power supply network while providing equally effective protection. The distinctive feature of the improved device lies in the fact that it has only one pair of high-value capacitors each connected in common in series with one of the power diodes of each phase and of the neutral when required, an auxiliary diode being associated with each capacitor.

BRIEF DESCRIPTION OF THE DRAWINGS

The single accompanying FIGURE illustrates a protection device in accordance with the present improvement of a three-phase electric power line which carries a normal voltage of 380 volts and a permanent current within the range of 25 to 700 amps and provides protection against electromagnetic disturbances of all kinds.

DETAILED DESCRIPTION OF THE INVENTION

The conductors 1, 3, 5 pass into a first stage 2 placed within a steel casing or shield enclosure which also surrounds the second stage 4. The first stage includes power surge arresters formed by a spark-gap (6, 36, 56) and a ground-connected series varistor (7, 37, 57) which has the design function of limiting the current removed by the surge arrester.

The first stage further includes inductors (8, 38, 58) for decoupling with respect to the second stage 4. These inductors are preferably of nonsaturable coiled aluminum sheet and are much less bulky than conventional inductance coils.

The design function of the first stage is to absorb from 60 to 80% of the energy of the incident wave by limiting its voltage at approximately 4000 volts and blocking the high-frequency components.

The first stage is connected to the second through the partition 9 with decoupling by capacitors (9A, 39A, 59A) having a value of the order of one microfarad. These capacitors remove the high-frequency portion which would otherwise remain in the incident wave.

The second stage is mainly composed of bridge limiters including in each phase two power diodes (15, capacitor (17, 18) which has a high value of capacitance of the order of 2000 microfarads and the other end of which is connected to ground (19). The capacitor 17 is in series with the diodes 15, 45 and 65 and the capacitor 18 is in series with the diodes 16, 46 and 66.

The common connection points or nodes 67, 68 between the power diodes and the capacitors are connected to each other through two auxiliary diodes 21, 22 mounted in opposite directions. A resistor (23, 24) is connected to the terminals of each capacitor. These resistors 23, 24 can serve to discharge the capacitors in the event of failure of the power supply network.

The time-delay contactor 10 has a position for charging the capacitors (terminals 11, 31, 51) through a resistor 20 and a rest position (terminals 12, 32, 52).

At the output of the second stage, conductors 29, 49, 69 connect the device to downstream equipment to be protected.

The operation of the second stage, which is similar to that described in the main patent in the case of a single-phase network, is as follows:

In steady-state operation and at the time of turn-on, the time-delay switch closes the circuit which passes through the resistor 20 during a period of one second. The capacitors 17, 18 are charged at a low rate, for example in positive polarity in the case of the capacitor 17 through the resistor 20 and the diode 21 and in negative polarity in the case of the capacitor 18 through the resistor 20 and the diode 22. The contactor then causes switching of the line (transfer to terminals 12, 32, 52).

This accordingly prevents any excessive initial current surge as a result of the high values of capacitance of the capacitors. These capacitors are then charged to the value of the peak voltage of the power supply network and in both polarities. The diodes 21, 22 are cut-off and the loss current is of very low value.

When an overvoltage arrives on the line on one or a number of phases of the power supply, it causes conduction of at least one pair of power diodes (15, 16; 45, 46 or 65, 66) and limits the overvoltage by virtue of the low impedance of the capacitors with respect to the frequency of the disturbance.

After occurrence of the overvoltage, the resistors connected to the terminals of the capacitors serve to charge the capacitors to the external value of the supply network. The contactor 10 is self-protected by the device.

What is claimed is:

1. A device for protecting a polyphase electric power line against high transient overvoltages of electromagnetic origin, comprising at least a first stage and a second stage following said first stage and connected in series therewith, the first stage being provided with a spark-gap and an inductor for providing voltage transient decoupling with respect to the second stage and said second stage having a bridge limiter including:

at least first and second high-value capacitors, at least first and second oppositely-biased power diodes for each of plural phases, each of said diodes being connected in series with a respective high-value capacitor via a respective connection point to form a pair of power diode/capacitor assemblies, a resistor, a pair of auxiliary diodes each coupled between said resistor and a respective one of said connection points, and a time-delay contactor coupled to said resistor and to at least one terminal of each power diode/capacitor assembly so as to first permit charging of the capacitors through said resistor and auxiliary diodes, and then permit cut-off of the bridge limiter once the capacitors have been charged, wherein said first high-value capacitor is connected in common in series with the first power diodes of each of said plural phases and said second high-value capacitor is connected in series in common with the second power diodes of each of said plural phases, an auxiliary diode being associated with each capacitor.

* * * * *